United States Patent [19]

Dwyer et al.

[11] 4,163,590

[45] Aug. 7, 1979

[54] UNIVERSAL FLOATING GUIDE MEANS

[75] Inventors: Gregory J. Dwyer, Livonia; Ivan L. Kauffman, Commerce Township, Oakland County, both of Mich.

[73] Assignee: Ex-Cell-O Corporation, Troy, Mich.

[21] Appl. No.: 731,172

[22] Filed: Apr. 12, 1977
(Under 37 CFR 1.47)

[51] Int. Cl.² ............................................. F16C 23/02
[52] U.S. Cl. ...................................... 308/3 R; 403/347
[58] Field of Search ............. 308/3 R, 3 A, 3 B, 4 R, 308/4 A, 4 C, 29, DIG. 4, 237 R; 403/347, 346, 59; 93/59 ES

[56] References Cited

U.S. PATENT DOCUMENTS 3,810,462  5/1974  Szpur ..................................... 403/59

Primary Examiner—Charles E. Frankfort
Attorney, Agent, or Firm—Robert G. Mentag

[57] ABSTRACT

A universal floating guide apparatus for guiding a reciprocating slide member so that the slide member does not rotate. The guide apparatus may be employed in reciprocating slides which have linear motion and which are employed in coated paperboard carton packaging machines, such as in a carton loading device and a carton stripper device for loading a carton on a carton forming mandrel, and for stripping a carton off the mandrel, respectively. The floating guide apparatus includes a slide member which is linearly guided and provided with a bore in which is mounted an axially movable bushing that is cross bored. Slidably mounted through the bushing cross bore is a fixed guide rod. The guide rod also extends through enlarged bores formed through the slide member. The bushing is movable axially and radially to take up errors in parallelism between a drive rod carrying the slide member and the guide rod, and prevents rotation and binding of the slide member throughout its stroke or movement. The bushing may be provided with an elongated cross bore or slot to provide a three-dimensional universal floating guide apparatus.

5 Claims, 9 Drawing Figures

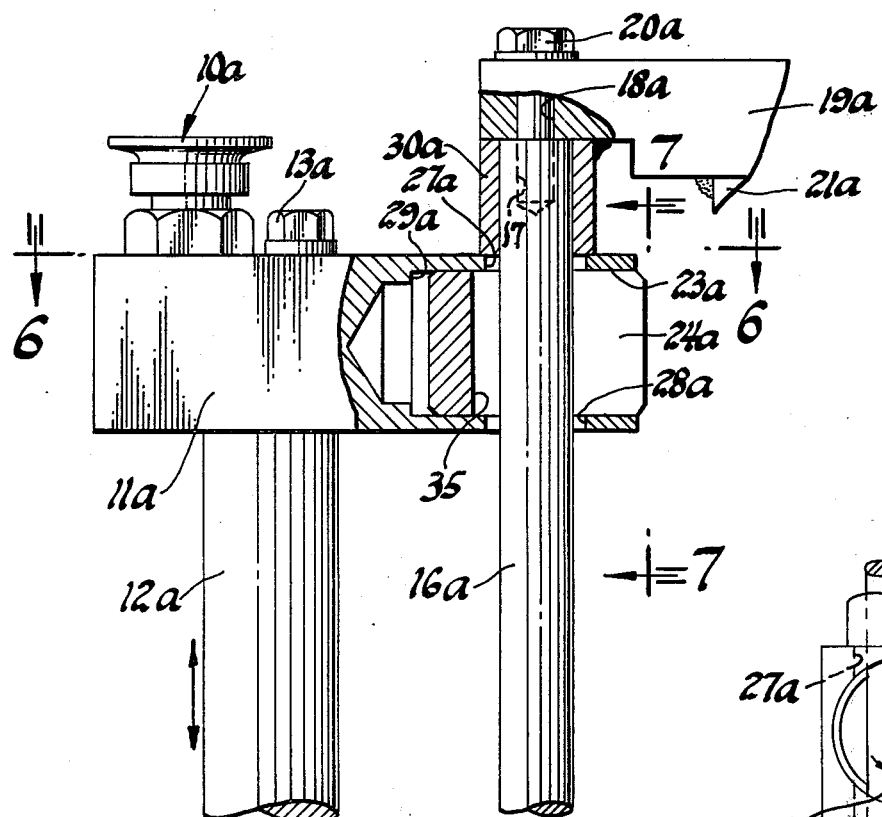
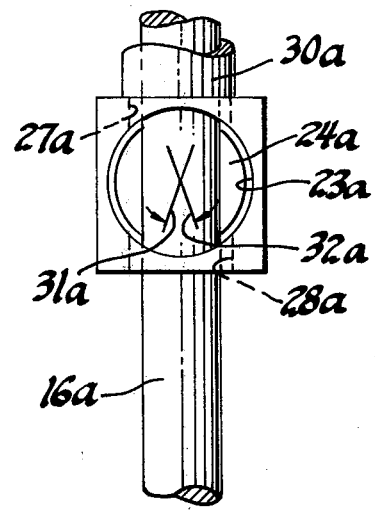
Fig. 5
Fig. 7
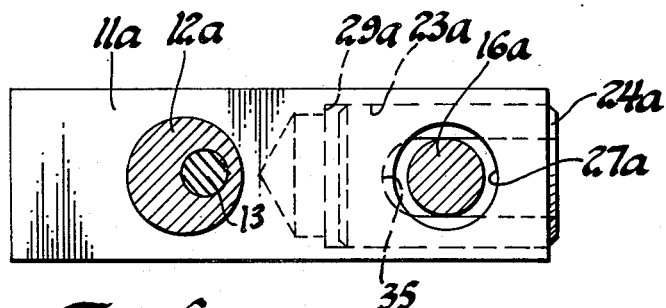
Fig. 6
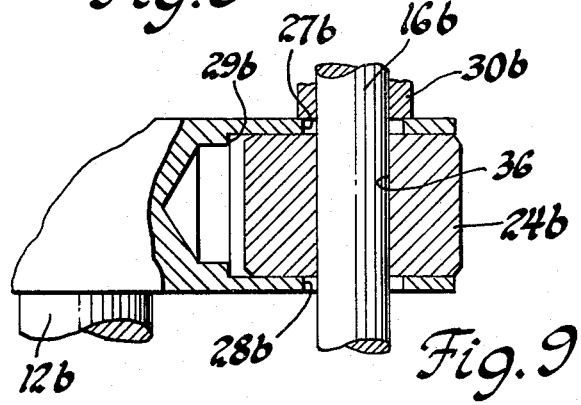
Fig. 9
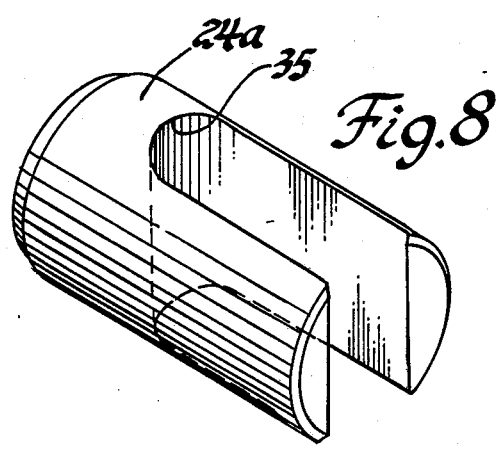
Fig. 8

UNIVERSAL FLOATING GUIDE MEANS

BACKGROUND OF THE INVENTION

1. Field of the Invention

This invention relates to coated paperboard carton packaging machines, and generally to carton loading and carton stripping apparatuses for these machines. The invention is particularly concerned with a slide guide means to prevent rotation of the slide during a reciprocating linear movement of the slide, yet to permit movement between the slide drive rod and guide rod to take up errors in parallelism.

2. Description of the Prior Art

It is well known in the coated paperboard carton packaging machine art to provide guide means for reciprocating linear drive rods for performing certain operations, such as carton loading and carton stripping operations. The prior art packaging machines have employed fork type guides on machine operating parts where a linear motion is employed. A disadvantage of such fork type guide means is that they have inherent tolerance problems between a drive shaft and a guide shaft, which results in binding between moving parts. The prior art guide means employ various types of notches and slots, which are all difficult to clean, and they are dirt collectors and hard to lubricate. A further disadvantage of the prior art guide structures is that they do not provide any lateral movement between a guide shaft and a drive shaft.

SUMMARY OF THE INVENTION

In accordance with the present invention, a floating guide means may be employed for guiding the upward and downward movement of various mechanisms, such as a carton loader apparatus, or a carton stripper apparatus. The floating guide means includes a slide which is linearly guided, and provided with a bore in which is mounted an axially movable bushing that is cross bored. A fixed guide rod is slidably mounted through the bushing cross bore and a pair of aligned, enlarged bores formed through the slide. The bores formed through the slide are formed to a diameter larger that the outer diameter of the fixed guide rod. The bushing is movable axially and radially, to take up errors in parallelism between a drive rod carrying the slide and the fixed guide rod, yet it prevents rotation and binding of the slide throughout its stroke or movement. The bushing may be provided with an elongated cross bar or slot to provide a three-dimensional universal floating guide means. The elongated slot in the bushing may be oval in shape, and the oval slot may be open at one end thereof to form an open-ended slot. The cross bore through the bushing may also be made to a size so as to provide the guide rod with only a sliding movement through the bushing. The bushing is made from a self-lubricating material such as nylon, carbon or any other suitable material.

The floating guide means of the present invention is advantageous in that no additional lubricant need be added which might pick up dirt, and it is relatively clean in that there are no pockets or notches or odd surfaces to collect dirt. The floating guide means of the present invention is also easy to clean and if, for example, the bushing is made of nylon, it could be easily washed off with water.

Other features and advantages of this invention will be apparent from the following detailed description, appended claims, and the accompanying drawings.

BRIEF DESCRIPTION OF THE DRAWINGS

FIG. 5 is a side elevation view of a second embodiment of the invention which employs a modified slide bushing.

FIG. 6 is a fragmentary, horizontal view of the embodiment illustrated in FIG. 5, taken along the line 6—6 thereof, and looking in the direction of the arrows.

FIG. 7 is a fragmentary, elevation view of the structure illustrated in FIG. 5, taken along the line 7—7 thereof, and looking in the direction of the arrows.

FIG. 8 is a perspective view of the slide bushing employed in the universal floating guide means of FIG. 5.

FIG. 9 is a fragmentary elevational view of a third embodiment of the present invention, with parts broken away and parts in section.

DESCRIPTION OF THE PREFERRED EMBODIMENTS

Figure 1:
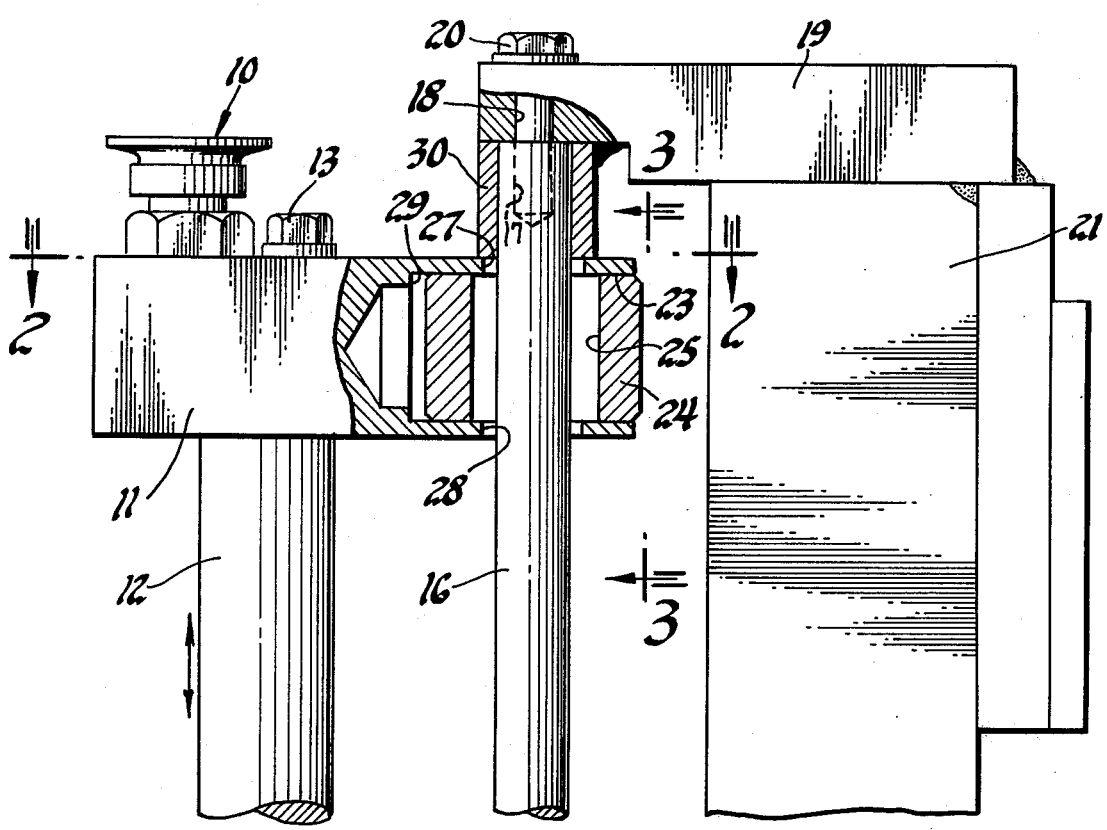
FIG. 1 is a side elevation view of a universal floating guide means embodiment made in accordance with the principles of the present invention, with parts broken away and parts in section.

Referring now to the drawings, and in particular to FIGS. 1 through 4, the numeral 10 generally designates a vacuum cup loader means employed in a coated paperboard carton packaging machine. The invention is illustrated as applied to a loader apparatus. However, it will be understood that the invention is also applicable to other mechanisms, as for example, a carton stripper mechanism. The numeral 12 designates a conventional loader drive rod on which is operatively mounted a slide member 11. The slide member 11 is fixedly secured to the drive rod 12 by any suitable means, as by a machine screw 13. An elongated guide rod 16 is disposed in a position parallel to the drive rod 12, and it is fixedly secured to any suitable supporting structure. In the illustration, the lower end of the guide rod is not shown, but it will be understood that it is also fixed in place in a suitable position.

The numeral 21 designates a guide rod support post which has a mounting arm 19 secured thereto, as by welding. The upper end of the guide rod 16 is fixed to the outer end of the mounting arm 19 by any suitable means, as by machine screw 20 which passes down through a bore 18 in the mounting arm 19, and into threadable engagement in a threaded bore 17 in the upper end of the guide rod 16. The lower end of the guide rod 16 may be fixedly secured to the lower end of the guide rod support post by a mounting arm similar to arm 19 and its attaching structure.

As shown in FIG. 1, the slide 11 is provided with a bushing bore 23 on the side thereof which is extended toward the guide rod 16. The bore 23 is formed longitudinally in the slide 11 and it is open at the one end of the slide. A slide bushing 24, made from bronze or any other suitable material having lubricating characteristics, is slidably mounted in the bore 23 for both axial and rotational movement therein. An elongated hole 25 in the form of an oval slot is formed through the bushing 24.

Figure 2:
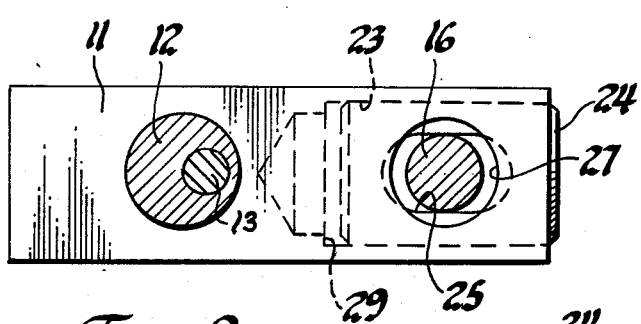
FIG. 2 is a fragmentary, horizontal view of the structure illustrated in FIG. 1, taken along the line 2—2 thereof, and looking in the direction of the arrows.
Figure 3:
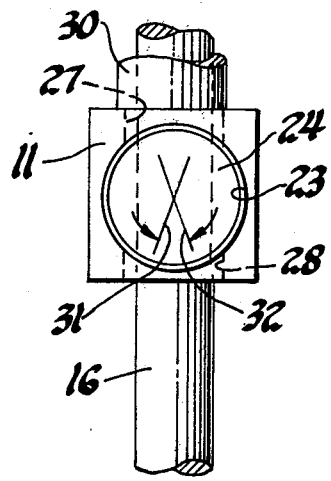
FIG. 3 is a fragmentary, elevation view of the structure illustrated in FIG. 1, taken along the line 3—3 thereof, and looking in the direction of the arrows.
Figure 4:
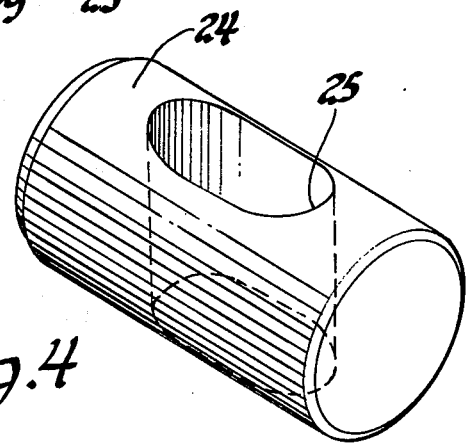
FIG. 4 is a perspective view of the slide bushing employed in the universal floating guide means of FIG. 1.

As shown in FIGS. 2 and 3, the guide rod 16 is adapted to be mounted through a bore 27 formed through the upper side of the slide 11 and a similar bore 28 formed through the lower side of the slide. The guide rod 16 extends vertically through the slide bores 27 and 28 and the elongated or oval slot 25. The bore 23 extends into the slide to a point indicated by the numeral 29 so as to permit axial movement of the bushing 24 in the bore 23. A suitable stop sleeve member 30 is mounted around the guide rod 16, and it is secured to the underside of the mounting arm 19 by an suitable means, as by being welded thereto.

In use, it will be seen that as the drive rod 12 is moved upwardly and downwardly, it will be guided by the guide rod 16 and the interconnecting slide block and movable bushing structure 11 and 24, respectively. It will be seen that as the slide 11 moves upwardly and downwardly on the guide rod 16, that the bushing 24 is free to move in three dimensions so as to provide a three-dimensional universal floating guide means. The guiding action between the drive rod 12 and the fixed rod 16 is provided by the sides of the guide rod 16 sliding on the transverse sides of the slot 25, as shown in FIG. 2. As shown in FIG. 3, the numerals 31 and 32 designate radial rotative positions which the bushing 24 can accomplish to provide limited rotation of the bushing 24.

FIGS. 5 through 8 illustrate a second embodiment of the invention and the parts thereof which are the same as the parts of the first embodiment of FIGS. 1 through 4 have been marked with the same reference numerals followed by the small letter "a". The floating guide structure illustrated in FIGS. 5 through 8 functions in the same manner as the guide structure illustrated in FIGS. 1 through 4. The only difference between the structure illustrated in the second embodiment of FIGS. 5 through 8 is that the elongated slot formed through the bushing is open at the end thereof, and it is designated by the numeral 35. The open ended elongated slot 35 is best seen in FIG. 8. The embodiment of FIGS. 5 through 8 provides for three-dimensional floating guiding action of the drive rod 12a relative to the guide rod 16a.

FIG. 9 illustrates a third embodiment of the invention, and the parts thereof which are the same as the parts of the first two embodiments have been marked with the same reference numerals followed by the small letter "b". The only difference between the third embodiment shown in FIG. 9 and the first two described embodiments is that the bushing 24b is not provided with an elongated slot for passage therethrough of the guide rod 16b. On the other hand, the guide rod 16b passes through the bushing 24b in a bore 36 so as to provide a slidable contact with the bore 36. The floating guide means illustrated in FIG. 9 is a bi-directional floating guide means.

While it will be apparent that the preferred embodiments of the invention herein disclosed are well calculated to fulfill the objects above stated, it will be appreciated that the invention is susceptible to modification, variation and change.

What is claimed is:

1. In a guide means for guiding a linearly movable slide member, the combination comprising:
    (a) a fixed guide rod;
    (b) the slide member being provided with a bore formed on an axis perpendicular to the direction of movement and the longitudinal axis of the guide rod;
    (c) a pair of aligned bores formed through the slide member and communicating with said first mentioned bore for reception of the guide rod, and being made to a diameter larger than the diameter of the guide rod and disposed concentric to the guide rod;
    (d) a bushing slidably mounted in the first mentioned bore in the slide member and having a cross-hole therethrough, through which the guide rod is movably mounted, whereby when the slide member is moved longitudinally of the guide rod, the bushing may float relative to the slide member and the guide rod.

2. A guide means for guiding a linearly movable slide member as defined in claim 1, wherein:
    (a) the cross-hole in said bushing is formed to a diameter so as to provide sliding engagement with the guide rod movably mounted therethrough.

3. A guide means for guiding a linearly movable slide member as defined in claim 1, wherein:
    (a) the cross-hole in said bushing is formed as an alongated slot through which the guide rod is movably mounted.

4. A guide means for guiding a linearly movable slide member as defined in claim 1, wherein:
    (a) the cross-hole in said bushing is formed as an oval slot through which the guide rod is movably mounted.

5. A guide means for guiding a linearly movable slide member as defined in claim 1, wherein:
    (a) the cross-hole in said bushing is formed as an oval slot, with an open side, through which the guide rod is movably mounted.

* * * * *